US008573407B2

(12) United States Patent
Jacobs et al.

(10) Patent No.: US 8,573,407 B2
(45) Date of Patent: Nov. 5, 2013

(54) AIR AND CONTAMINANT ISOLATION AND REMOVAL APPARATUS AND METHOD

(75) Inventors: Brian A Jacobs, Lake Worth, FL (US); William A Jacobs, Lake Worth, FL (US); Alan J Sandler, Boca Raton, FL (US)

(73) Assignee: Puradyn Filter Technologies, Inc., Boynton Beach, FL (US)

( * ) Notice: Subject to any disclaimer, the term of this patent is extended or adjusted under 35 U.S.C. 154(b) by 871 days.

(21) Appl. No.: 12/184,621

(22) Filed: Aug. 1, 2008

(65) Prior Publication Data

US 2011/0056879 A1 Mar. 10, 2011

(51) Int. Cl.
*B01D 15/00* (2006.01)
*B01D 29/00* (2006.01)
*B01D 36/00* (2006.01)

(52) U.S. Cl.
USPC ........ 210/502.1; 210/689; 210/256; 210/342; 55/421

(58) Field of Classification Search
USPC .................. 210/689, 512.1, 256, 342; 55/421
See application file for complete search history.

(56) References Cited

U.S. PATENT DOCUMENTS 4,242,206 A * 12/1980 Estabrooke .................. 210/489
4,429,001 A * 1/1984 Kolpin et al. ................ 442/340
4,838,040 A * 6/1989 Freeman ........................ 62/475
4,861,470 A * 8/1989 Casey ........................ 210/172.5
5,035,805 A * 7/1991 Freeman et al. .............. 210/689
5,252,203 A * 10/1993 Lyda .......................... 210/172.5
5,500,038 A * 3/1996 Dauber et al. .................. 96/135
5,630,855 A 5/1997 Lundback
7,037,359 B1 * 5/2006 McCauley ...................... 95/141
2003/0000886 A1 * 1/2003 Breillatt et al. ............... 210/435
2003/0047511 A1 * 3/2003 Burton et al. ................. 210/660
2004/0099606 A1 * 5/2004 McGarvey et al. ........... 210/689
2004/0222140 A1 * 11/2004 Bortnik ......................... 210/266
2005/0092176 A1 * 5/2005 Ding et al. ........................ 95/90
2006/0102557 A1 * 5/2006 Hurley ....................... 210/502.1
2006/0124552 A1 * 6/2006 Nagai et al. ................... 210/689

FOREIGN PATENT DOCUMENTS

DE 20 2008 016 281 5/2010
GB 2 034 192 10/1978
WO WO 93/22025 11/1993

* cited by examiner

*Primary Examiner* — Tony G Soohoo
*Assistant Examiner* — Peter Keyworth
(74) *Attorney, Agent, or Firm* — Allen D. Hertz, P.A.; Allen D. Hertz

(57) ABSTRACT

A lubricant reclamation system having a moisture absorbent cartridge (140). The cartridge (140) is fabricated placing a Superabsorbant Polymer (SAP) (142) within a boundary of polyester mesh (143). Moisture is extracted from a lubricant or other fluid and absorbed by the SAP. The moisture latent SAP bonds to the polyester mesh (143), potentially turning into a gel. A layer of polypropylene sorbent (144) is placed about the exterior of the boundary material (143), ensuring any moisture remains exterior to the sorbent layer (144). A resin layer can optionally be placed within a fluid flow following the discharge from polypropylene sorbent extracting aerosol from within the lubricant and as a barrier of detrimental ions with an exchange of beneficial ions. The entire cartridge can be placed within an enclosure or pouch body (162). The body (162) is designed to expand, accommodating a resultant increase in SAP volume. The cartridges can be integrated into filters comprising commonly known filtration elements.

19 Claims, 13 Drawing Sheets

AIR AND CONTAMINANT ISOLATION AND REMOVAL APPARATUS AND METHOD

BACKGROUND OF THE INVENTION

1. Field of the Invention

The present invention relates to a fluid purification system and more specifically to a device and method for removing aerosols and contaminants from fluids such as lubricants, fuels, and the like.

2. Discussion of the Related Art

This invention relates to fluid purification devices and method, which are preferably used in conjunction with engines using lubricating oils or hydraulic systems. More particularly, the present invention provides several unique oil/lubricant treatment configurations creating a unique system for fluid reconditioning.

Oil reclamation devices are known to incorporate an evaporator head having a heat-transmitting member mounted within a cavity. The heat-transmitting device can incorporate baffles to form a baffled evaporator chamber.

Oil filters are provided in a variety of form factors and materials. Common filters comprise a filtering medium disposed within a canister and sealed via a top member. A mechanical interface, such as a threaded interface, and fluid transfer means, such as an oil inlet and an oil outlet, are integrated into the top member. The filtering materials can be a paper product, a synthetic filtering material, and the like.

Oil reclamation devices can additionally include soluble oil additives for enriching the oil over a period of time. The additives are positioned within the filter in a section between the particle filtering material and a felt pad. The additives are placed to contact the oil and formulated to dissolve over a period of time.

Oil reclamation devices generally manage aerosols by releasing them to the atmosphere. This creates an undesirable configuration for pollution control.

Superabsorbent polymers (SAP) (also called slush powder) are polymers that can absorb and retain extremely large amounts of a liquid relative to its own mass.

Water absorbing polymers, classified as hydrogels, absorb aqueous solutions through hydrogen bonding with the water molecule. So an SAP's ability to absorb water is a factor of the ionic concentration of an aqueous solution. In de-ionized and distilled water, SAP may absorb 500 times its weight (from 30-60 times its own volume), but when put into a 0.9% saline solution, the absorbency drops to may be 50 times its weight. The presence of valent cations in the solution will impede the polymers ability to bond with the water molecule.

Superabsorbent polymers are now commonly made from the polymerization of acrylic acid blended with sodium hydroxide in the presence of an initiator to form poly-acrylic acid, sodium salt (sometimes referred to as cross-linked sodium polyacrylate). This polymer is the most common type of SAP made in the world today. Other materials are also used to make a superabsorbent polymer, such as polyacrylamide copolymer, ethylene maleic anhydride copolymer, cross-linked carboxy-methyl-cellulose, polyvinyl alcohol copolymers, cross-linked polyethylene oxide, and starch grafted copolymer of polyacrylonitrile to name a few. The latter is one of the oldest SAP forms created.

Today superabsorbent polymers are made using one of two primary methods; suspension polymerization or solution polymerization. Both processes have their advantages over the other and both yield a consistent quality of product.

Solution based polymerization is the most common process used today for SAP manufacture. This process is efficient and generally has a lower capital cost base. The solution process uses a water based monomer solution to produce a mass of reactant polymerized gel. The polymerization's own reaction energy (exothermic) is used to drive much of the process, helping reduce manufacturing cost. The reactant polymer gel is then chopped, dried and ground to its final granule size. Any treatments to enhance performance characteristics of the SAP are usually accomplished after the final granule size is created.

The suspension process is practiced by only a few companies because it offers a higher degree of production control and product engineering during polymerization step. This process suspends the water-based reactant in a hydrocarbon-based solvent. The net result is that the suspension polymerization creates the primary polymer particle in the reactor rather than mechanically in post-reactions stages. Performance enhancements can also be during or just after the reaction stage.

The type and degree of cross-linking to the polymer control the total absorbency and swelling capacity. Low density cross-linked SAP generally has a higher absorbent capacity and swell to a larger degree. These types of SAPs also have a softer and more cohesive gel formation. High cross-link density polymers exhibit lower absorbent capacity and swell. The gel strength is firmer and can maintain particle shape even under modest pressure.

Oil reclamation processes have a general trend of extracting aerosols, such as hydrocarbons, and releasing them to the atmosphere. This process is considered as lacking consideration for the environment, and several states are currently focusing on legislation to reduce or eliminate this practice.

Thus, what is desired is a lubrication reclamation system providing optimal control of the purification process. Additionally, designed is the ability for the end user to tailor the configuration for both purification and monitoring via a plurality of stacked array members.

SUMMARY OF THE INVENTION

The present invention is directed to a lubricant reclamation system comprising a reclamation cartridge utilizing a superabsorbing material encased within a polyester mesh. The mesh is encapsulated within a layer of sorbant. An optional layer of resin can be placed between the sorbant and the outlet port of the system. The reclamation device can be enclosed within an expandable casing.

In a first aspect of the present invention provides an aerosol and water absorption apparatus utilizing a superabsorbent polymer (SAP) material encased within a polyester mesh forming a reclamation cartridge. The reclamation cartridge can be enclosed within an expandable casing. The SAP extracts and combines with the moisture from within the fluid, then bonds to the polyester mesh.

While another aspect of the present invention provides a layer of sorbant which repels any moisture that was not previously extracted by the SAP.

With another aspect of the present invention utilizing a layer of resin disposed upstream in the process for the removal of any remaining aerosol. Additionally, the resin layer captures inbound detrimental ions and releases beneficial ions into the lubricant through a process generally understood as ion exchange.

Yet another aspect introduces various geometric configurations for the reclamation cartridge, including:

a. a folded and bonded cartridge similar to a burrito;
b. a rolled cartridge forming a spiraled core;
c. a rectangular shaped pouch;

d. a circular shaped pouch;
e. a star shaped pouch;
f. a cylindrically shaped pouch;
g. an expandable enclosure; and
h. a baffled enclosure.

Wherein another aspect places the reclamation cartridge within an expanding housing.

Another aspect provides a plurality of cartridges disposed within a single housing.

In another aspect, a resin layer is disposed between a flow exit region of the cartridges and a discharge orifice of the filter.

While another aspect of the present invention provides a replaceable cartridge within a reclamation filter comprising common lubricant filtration elements.

The present invention provides an apparatus configurable for the following:
 a. removal of water only;
 b. removal of water and gaseous (aerosol) contaminants; and
 c. removal of water, gaseous (aerosol) contaminants, and sodium ion barriers; and
 d. providing Sodium ion barriers.

The present invention can be utilized for any potentially moisture impregnated fluid, including:
 a. internal combustion engine fuel,
 b. oil,
 c. brake fluid,
 d. power steering fluid,
 e. transmission fluid,
 f. hydraulic fluid,
 g. and the like.

The present invention can incorporate a hydrated Calcium Sodium Potassium Aluminum Silicate embedded within a polymer (ion exchange) resin bed for absorbing gases like hydrocarbons. Alternately, any of the following can be used:
 a. Sodium Potassium Aluminum Silicate,
 b. Hydrated Calcium Aluminum Silicate,
 c. Hydrated Sodium Aluminum Silicate,
 d. Hydrated Calcium Sodium Aluminum Silicate,
 e. Hydrated Sodium Potassium Calcium Aluminum Silicate, and
 f. Hydrated Sodium Calcium Magnesium Aluminum Silicate.

These and other features, aspects, and advantages of the invention will be further understood and appreciated by those skilled in the art by reference to the following written specification, claims and appended drawings, which follow.

BRIEF DESCRIPTION OF THE DRAWINGS

For a fuller understanding of the nature of the present invention, reference should be made to the accompanying drawings in which.

Like reference numerals refer to like parts throughout the several views of the drawings.

DETAILED DESCRIPTION OF REPRESENTATIVE EMBODIMENTS

Figure 1:
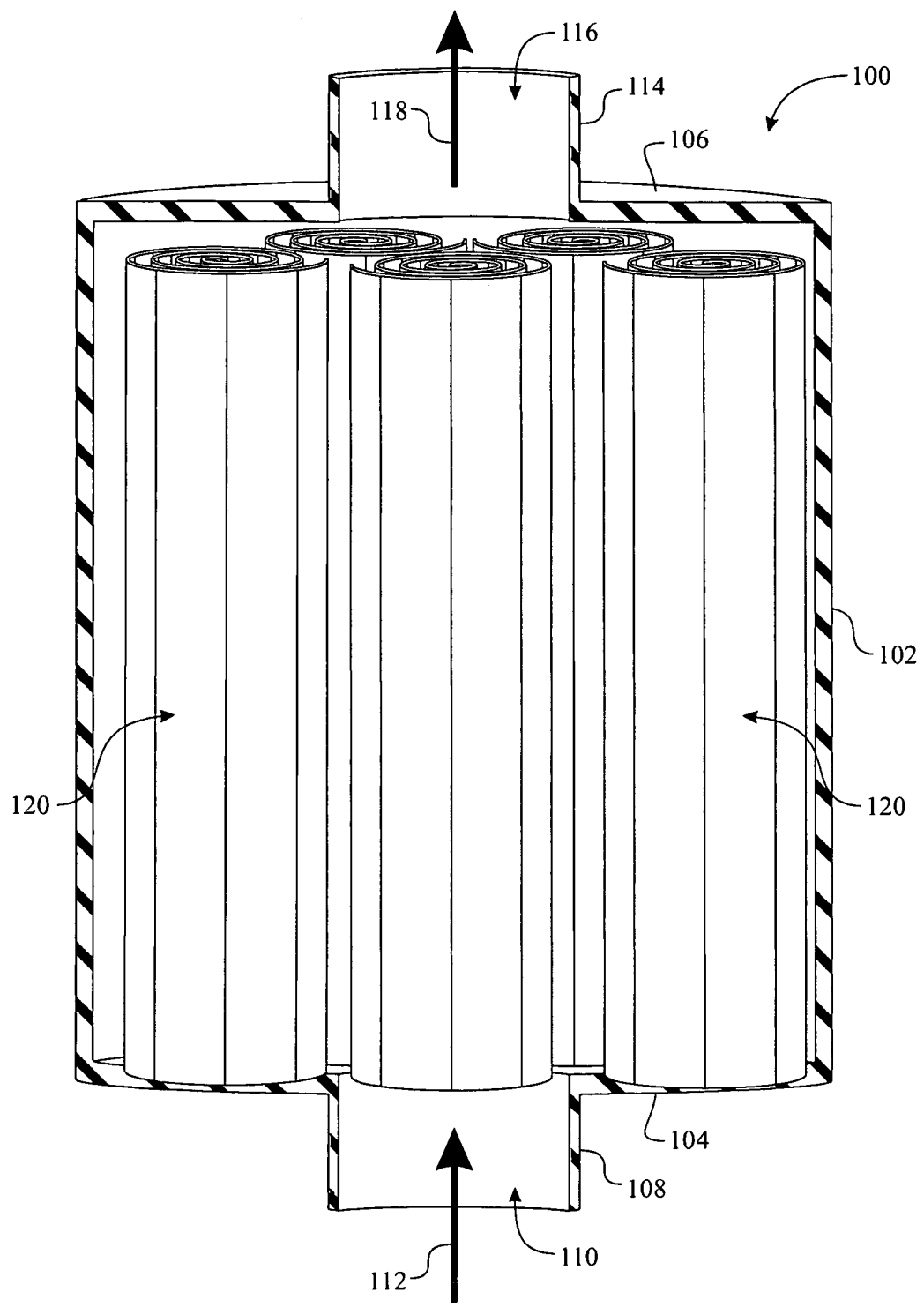
FIG. 1 presents a sectional view of a moisture extracting apparatus in accordance with a first exemplary embodiment of the present invention.

For purposes of description herein, the terms "upper", "lower", "left", "rear", "right", "front", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A moisture-extracting device, generally referenced as 100, is presented in a sectioned elevation view illustrated in FIG. 1. The moisture extracting device 100 is defined as a chamber formed having a filter housing sidewall 102 formed into a tubular structure with an inlet end wall 104 disposed at a first end and an outlet end wall 106 disposed at a second end. The filter housing sidewall 102 can have any cross sectional shape, including circular, round, rectangular, a polygon, and the like. An inlet coupler 108 is disposed upon the inlet end wall 104, providing an inlet orifice 110 for receiving an inlet flow 112. The moisture-extracting device 100 is removably coupled to a supply portion of a fluid reclamation system via the inlet coupler 108. The inlet coupler 108 can be a pipe neck, a threaded interface, or any other interface known by those skilled in the art. A discharge coupler 114 is disposed upon the outlet end wall 106 providing a discharge means for the moisture-extracting device 100. The discharge coupler 114 provides a discharge orifice 116 for directing a discharge flow 118. The discharge coupler 114 is preferably a form factor consistent with the inlet coupler 108 form factor. A fluid, such as a fuel, a lubricant, and the like, flows into an interior chamber via the inlet flow 112, into the interior of the filter housing sidewall 102 wherein moisture is extracted via a plurality of water absorption inserts 120 disposed therein, and exits via the discharge flow 118. The overall flow path is illustrated as a medium flow path 230.

Figure 2:
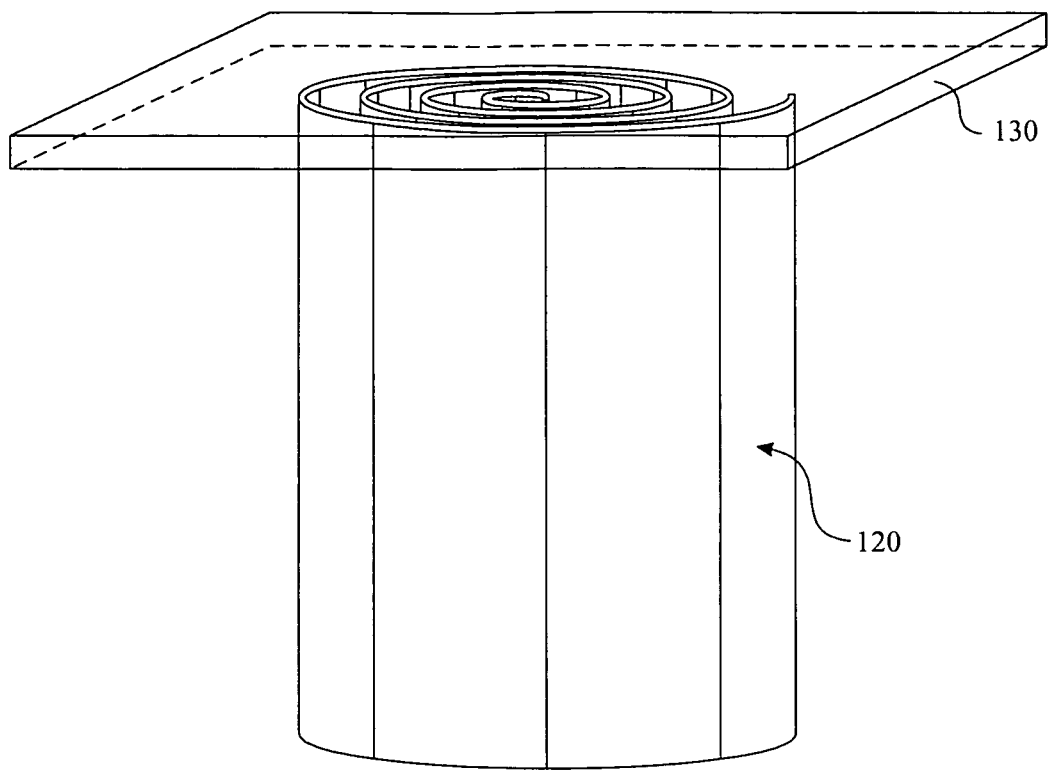
FIG. 2 presents an isometric view of a first exemplary reclamation cartridge presented in a rolled form factor, abutting a resin layer.
Figure 3:
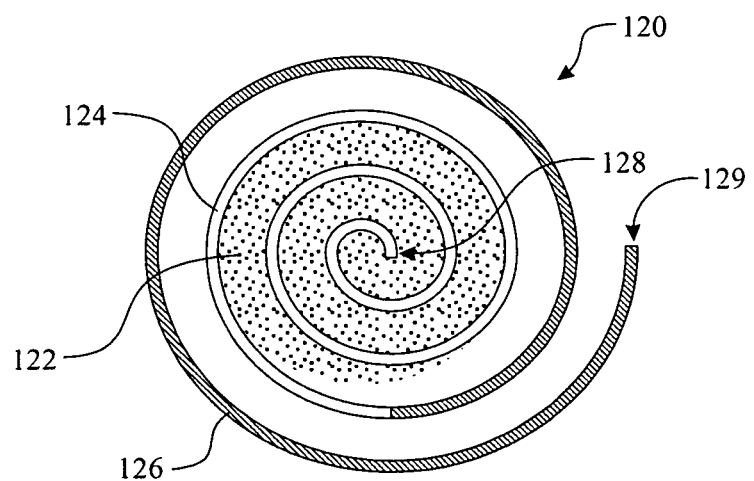
FIG. 3 presents a top view of the rolled embodiment of the reclamation cartridge.

The water absorption insert 120 is a first exemplary embodiment presented in detail in FIGS. 2 and 3. The water absorption insert 120 is formed via rolling Superabsorbant Polymer (SAP) 122 within a sheet of polyester mesh 124, starting at a core center 128 and continuing to a wrap edge 129. A polypropylene sorbant 126 is grafted onto an outer edge of the polyester mesh 124 and continues to be wrapped about the core. A resin layer 130 can be disposed about a discharging end of the water absorption insert 120 for additional purification processing. The Superabsorbant Polymer (SAP) 122 is described in the background section of the specification. The fluid enters an entry end of the water absorption insert 120 exposing the fluid to the Superabsorbant Polymer (SAP) 122. The Superabsorbant Polymer (SAP) 122 extracts and absorbs any moisture from the fluid. The absorption process causes the Superabsorbant Polymer (SAP) 122 to expand to a volume that is potentially up to 500 times the original volume. The spiral design allows the water absorption insert 120 to expand in accordance with the absorption of the moisture by the Superabsorbant Polymer (SAP) 122. The resin layer 130 abutting the fluid discharging end of the water absorption insert 120 then entraps any excess or escaping moisture. The fluid can additionally be processed via a polypropylene sorbant 126, wherein the polypropylene sorbant 126 repels any excess water and gel, allowing the lubricating fluid to flow through. This increases the opportunity for the Superabsorbant Polymer (SAP) 122 to extract the moisture.

Figure 4:
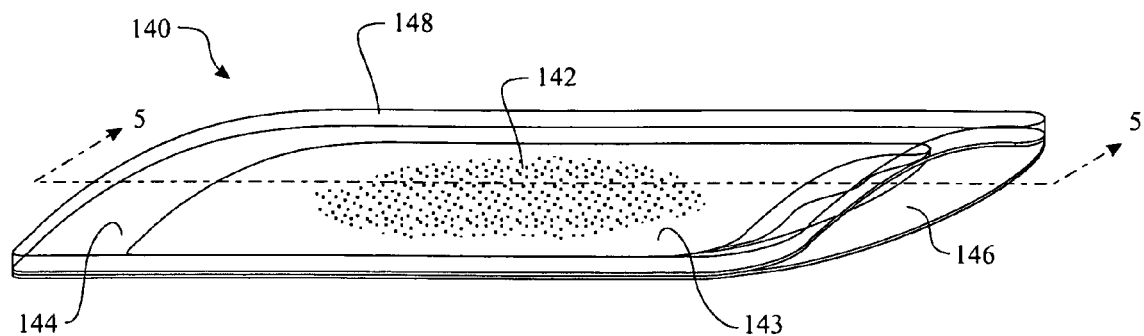
FIG. 4 presents an isometric view of a second exemplary reclamation cartridge presented in a pouch form factor.
Figure 5:
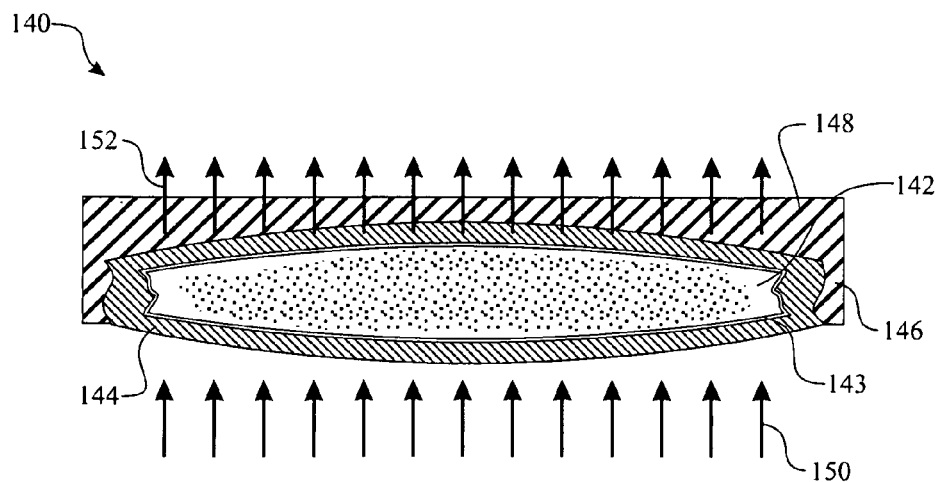
FIG. 5 presents a sectional view of the pouch reclamation cartridge taken along section 5-5 of FIG. 4.
Figure 6:
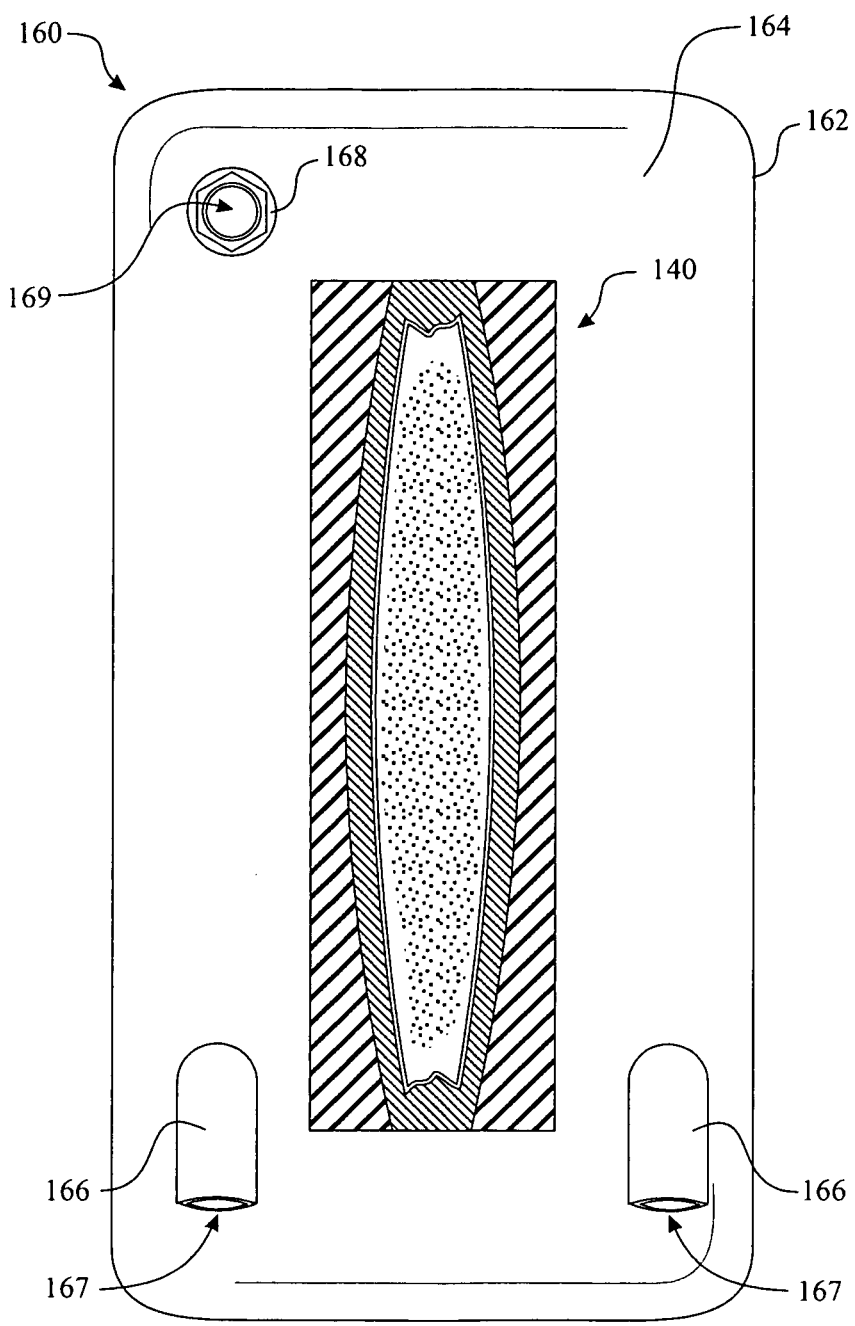
FIG. 6 presents a planar view of a third exemplary reclamation cartridge enclosing the reclamation pouch within a casing.

An alternate form factor is presented as a moisture absorbent cartridge 140 illustrated in FIG. 4, with a sectional side view presented in FIG. 5. The moisture absorbent cartridge 140 includes the same materials of the water absorption insert 120, encasing a Superabsorbant Polymer (SAP) 142 within a polyester mesh 143. The polyester mesh 143 is enclosed within a polypropylene sorbant 144. An expandable sidewall 146 is disposed upon a discharging side of the polypropylene sorbant 144, as illustrated. The moisture absorbent cartridge 140 would be arranged within the fluid flow providing an inlet flow 150 into an entry side and an outlet flow 152 projecting from a discharge side of the moisture absorbent cartridge 140. Moisture would be extracted by the Superabsorbant Polymer (SAP) 142, increasing the volume of the Superabsorbant Polymer (SAP) 142 particles. The moisture impregnated Superabsorbant Polymer (SAP) 142 bonds to the polyester mesh 143, allowing reclaimed fluid to pass through the polyester mesh 143 via the outlet flow 152. The geometry of the moisture absorbent cartridge 140 is such, providing a means for expansion. One such means would be an expandable sidewall 146. Another is via utilizing a flexible material allowing the upper and lower surfaces to expand as illustrated. Any residual moisture is repelled via the polypropylene sorbant 144. Additional reclamation is provided via a resin layer 148, the resin layer 148 absorbs any aerosols, such as hydrocarbons. Additionally, the resin layer 148 releases ions into the fluid. An exemplary use of the resin layer provides an ion exchange barrier to exchange, for example, sodium ions for another beneficial ion.

The resin layer 148 can provide two (2) distinct purposes via three (3) different methods. The first purpose is to remove and capture aerosols contaminating the subject fluid. The aerosols requiring removal are generally between $1/10^{th}$ micron-$3/10^{ths}$ micron in size. This is accomplished via a first method, utilizing natural minerals such as those in the zeolite group, or perlite a volcanic glass converted to a form with millions of microstructures, which can contain aerosols via a superheating process. The microchannels in Zeolite and expanded Perlite are typically $1/10^{th}$ to 1 micron with sharp edges to strain or shear the aerosols from the fluid.

The second purpose is to release beneficial ions into the subject fluid. This can be accomplished in any of at least three distinct methods. A first method is an extension of the aerosol removal method described above. The material used for extracting aerosol can also be used for an ionic exchange process. Inbound Sodium ions are captured, in exchange for a beneficial ion, which is released into the subject fluid. The process can be tailored by the selection of the specific mineral or volcanic mixture utilized.

A second method is provided by a selection of a synthetic polymer resin. Without this polymer we would otherwise need some kind of a binder for the minerals in the zeolite family or for the expanded perlite, The synthetic polymer resin provides the same ion exchange method as described above, utilizing different beneficial ions.

A third method utilized embedded zeolite, perlite, or a combination therein, embedded within the resin bed. This combination provides benefits found in each of the previously described methods.

The reclamation cartridges can be packaged into a variety of form factors. A first exemplary packaging places the inlet end wall 104 into an expanding absorbent pouch 160. The expanding absorbent pouch 160 comprises pouch body 162 having a pouch interior 164 with at least one inlet connector 166 and at least one outlet connector 168. The inlet connector 166 provides an inlet port 167 in fluid communication with the interior for entry of the subject fluid. The outlet connector 168 provides an outlet port 169 in fluid communication with the interior for discharge of the subject fluid. The interior can be defined as a shell having an upper surface, a lower surface and a perimeter surface disposed there between. The design can provide at least one inlet port 167 having a total cross sectional area that is larger than the at least one outlet port 169 total cross sectional area, creating a positive internal pressure. The fluid holding container can be in a rectangular form factor (as shown), a circular form factor, a bladder that comprises a plurality of expanding sections, an accordion shaped bladder, and the like.

Figure 7:
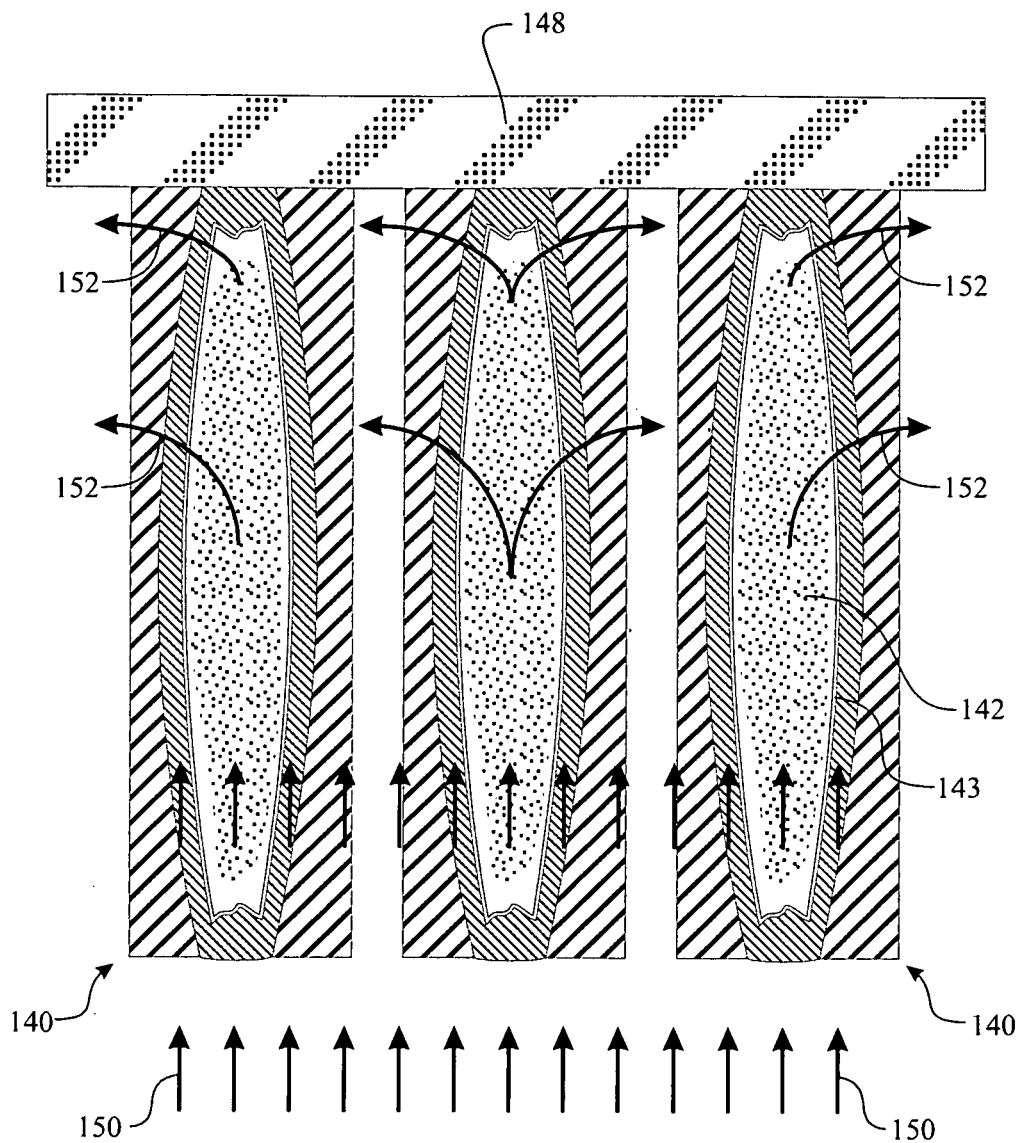
FIG. 7 presents a plurality of reclamation cartridges abutting a resin layer, presenting a fluid flow path.
Figure 8:
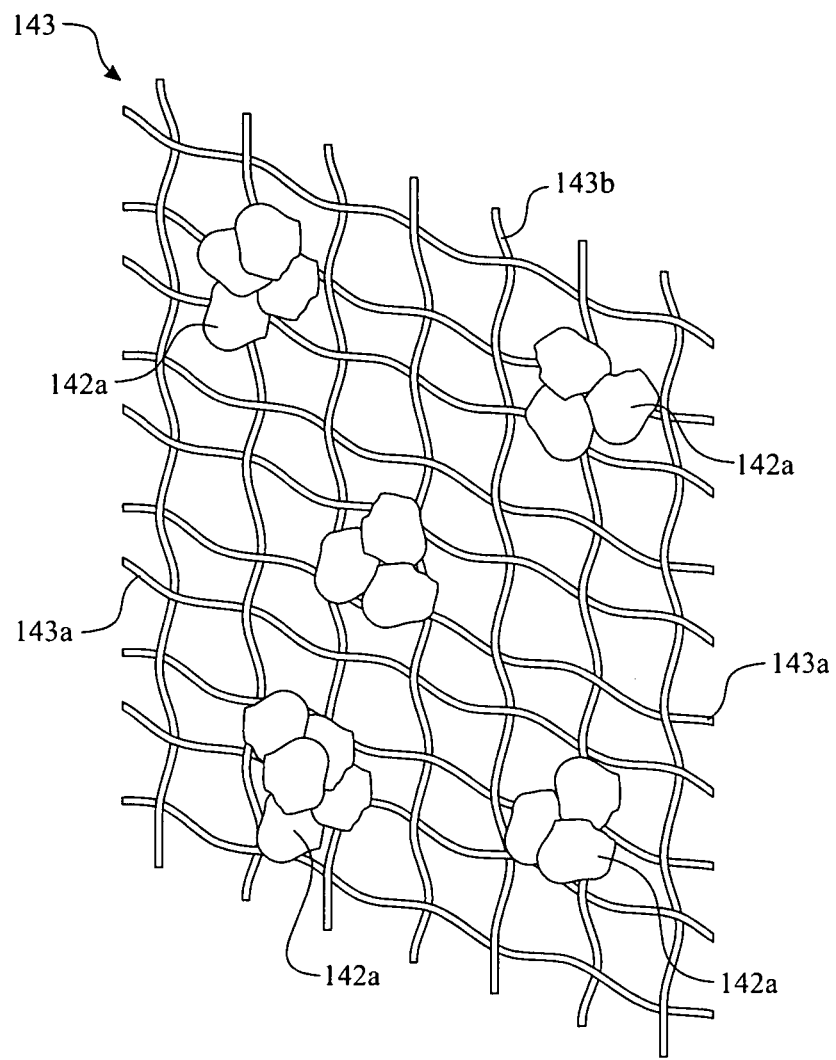
FIG. 8 presents a magnified isometric view of moisture impregnated super-absorbing particles bonded to a polyester mesh.

A plurality of moisture absorbent cartridges 140 can be disposed within a single container providing a directed flow as presented in FIG. 7. An inlet flow 150 enters the plurality of moisture absorbent cartridges 140, flowing towards a resin layer 148. The resin layer 148 limits the fluid flow, creating a pressure within the moisture absorbent cartridges 140. The fluid is then deflected, providing an outlet flow 152 that is generally perpendicular to the direction of the inlet flow 150. The increased pressure assists the Superabsorbant Polymer (SAP) 142 in the absorption process as well as the process of bonding the Superabsorbant Polymer (SAP) 142 to the polyester mesh 143.

One of the key inventions in the reclamation process is the utilization of the polyester mesh 143 for bonding and containing the Superabsorbant Polymer (SAP) 142. The polyester mesh 143 is fabricated in any method; with an exemplary embodiment being a woven mesh as illustrated. The woven mesh is formed via weaving a plurality of first oriented polyester mesh fibers 143a with a plurality of second oriented polyester mesh fibers 143b. Moisture is absorbed by the Superabsorbant Polymer (SAP) 142 generating a moisture set SAP 142a. The moisture set SAP 142a bonds to the polyester mesh 143 as illustrated; whereas heat as in engine oil operating temperatures may be used to accelerate the reaction. As the Superabsorbant Polymer (SAP) 142 absorbs the moisture, the Superabsorbant Polymer (SAP) 142 expands. The moisture absorbent cartridge 140 is placed within an enclosure; the enclosure is designed to expand to accommodate the increase in volume. The expansion design can be of any reasonable form factor.

Figure 9:
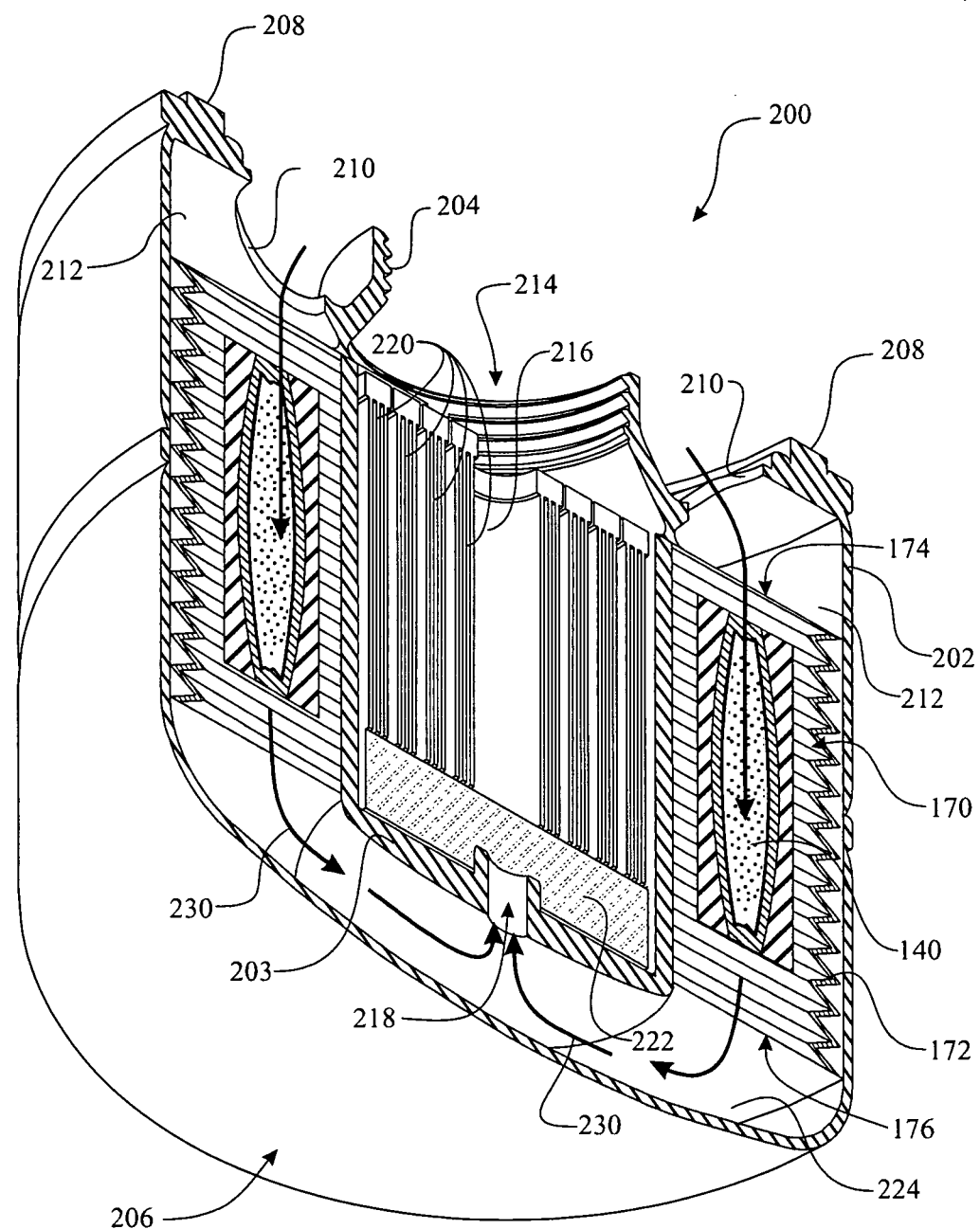
FIG. 9 presents an isometric sectional view of a lubricating filter incorporating an expanding reclamation cartridge.
Figure 10:
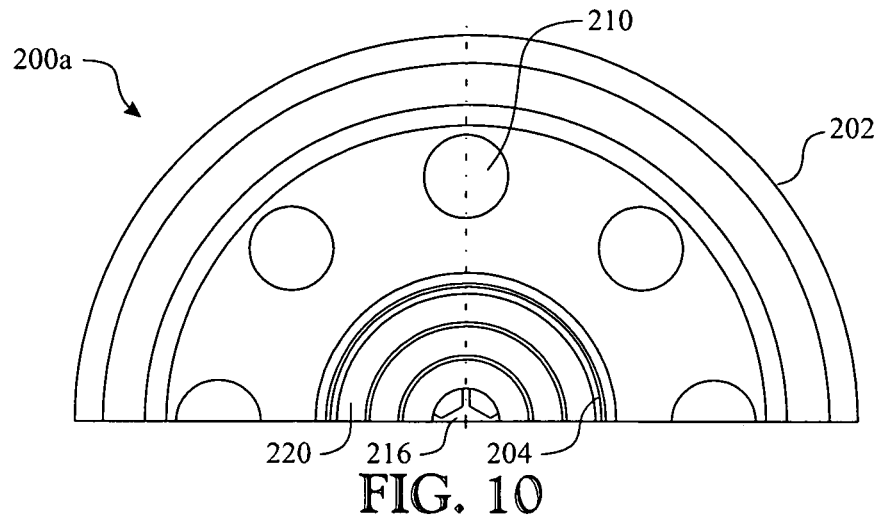
FIG. 10 presents a partial top view of the lubricating filter.
Figure 11:
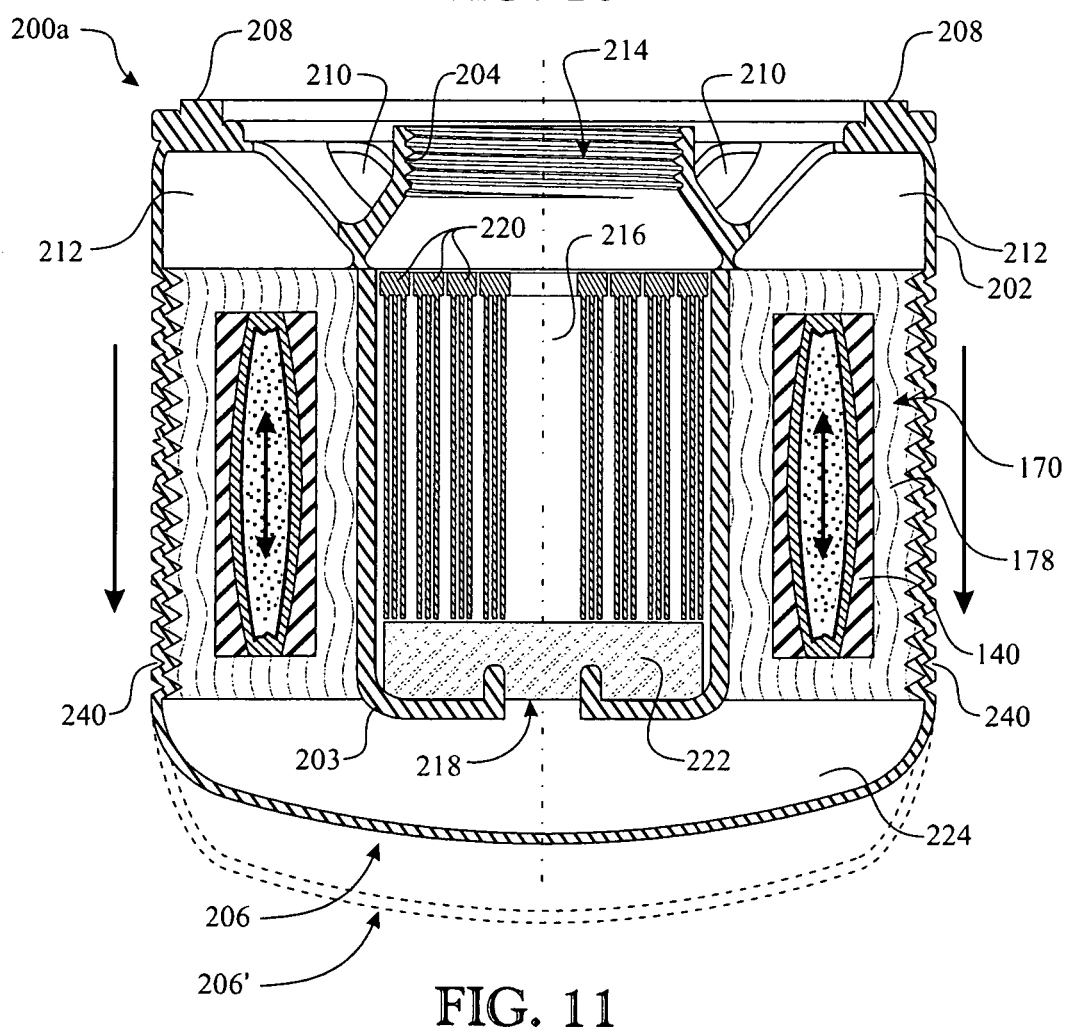
FIG. 11 presents an elevation sectioned view of the lubricating filter similar to the filter of FIG. 9, incorporating an expansion feature into a sidewall of the filter housing.

The moisture absorbent cartridge 140 can be integrated into a lubricant reclamation filter such as a moisture absorbing filter assembly 200. It is recognized that the integration can be provided in any reasonable configuration, with a first exemplary embodiment illustrated in FIGS. 9-11. The moisture absorbing filter assembly 200 incorporates the commonly known filtration elements, including a filter canister 202 being removably secured to a filter mount (not shown) via a filter mounting interface 204. One commonly used mounting is a threaded interface. The end of the moisture absorbing filter assembly 200 opposing the filter mounting interface 204 is referenced as a filter bottom 206. A mounting seal 208 is provided extending from an upper surface of the filter canister 202 being located proximate an outer circumference of the filter canister 202. The mounting seal 208 provides a fluid seal between the moisture absorbing filter assembly 200 and the filter mount. A plurality of inlet ports 210 is formed in the upper surface providing a means for passing fluid from the system (not shown), into the moisture absorbing filter assembly 200. The inbound fluid is distributed via an inlet manifold 212, entering an expanding absorbent container 170 within the moisture absorbing filter assembly 200. The moisture absorbing filter assembly 200 incorporates a canister interior wall member 203 separating a moisture absorption section and a filtration section. At least one interior wall port 218, located in the lower portion of the canister interior wall member 203, provides a transition between the moisture absorption section and a filtration section of the moisture absorbing filter assembly 200. A plurality of moisture absorbent cartridges 140 are encased within a porous and pliant material 178 within an expanding exterior wall 172 of the expanding absorbent container 170, wherein the porous and pliant material 178 is a material that allows for passage of fluid therethrough. The fluid flows into the expanding absorbent container 170 via a first expanding end 174, continuing into the plurality of moisture absorbent cartridges 140. The moisture absorbent cartridge 140 absorbs the moisture from the fluid as previously described. As the moisture is absorbed, the SAP 122 increases in volume, and the expanding exterior wall 172 expands longitudinally to accommodate the increase in stored volume reconfiguring the filter bottom 206 from a originally manufactured configuration illustrated as a solid line to an extended configuration 206' illustrated as a broken line. Once fluid is processed, it is discharged through a second expanding end 176 of the expanding absorbent container 170, passing into an expansion region 224. The fluid continues, flowing through the interior wall port 218, transitioning from a moisture removal process to an aerosol removal and filtration process. A resin layer 222 is provided proximate the transition for removal of aerosols from the fluid. The fluid continues into a filtration chamber comprising filter membranes 220. An exit conduit 216 can be provided for discharging the fluid through the exit port 214. The exit conduit 216 can be hollow or filled with a filtration means.

Figure 12:
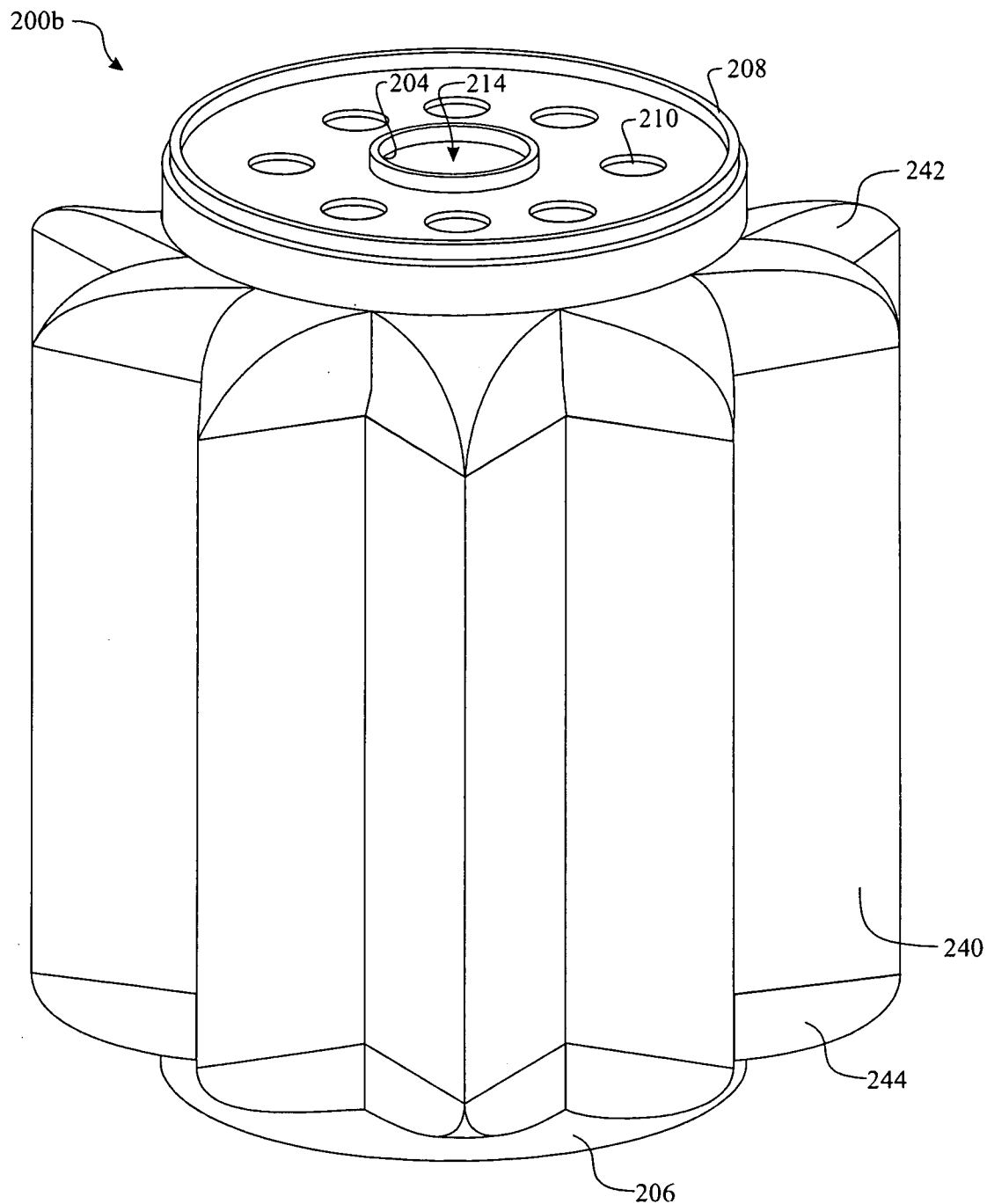
FIG. 12 presents an isometric view of a second lubricating filter embodiment, incorporating an alternate expanding sidewall design.

A third exemplary embodiment illustrated in FIG. 12 and referred to as moisture absorbing filter assembly 200b. In the third embodiment, the expansion is also integrated into the filter canister 202 via a canister expansion section 240. An expansion adaptation upper member 242 and a expansion adaptation lower member 244 are disposed, providing a transition between the canister expansion section 240 and the filter canister 202. The canister expansion section 240 expands circumferentially to accommodate the increase in volume of the Superabsorbant Polymer (SAP) 122. It is recognized the expansion design can be left to the designer.

Figure 13:
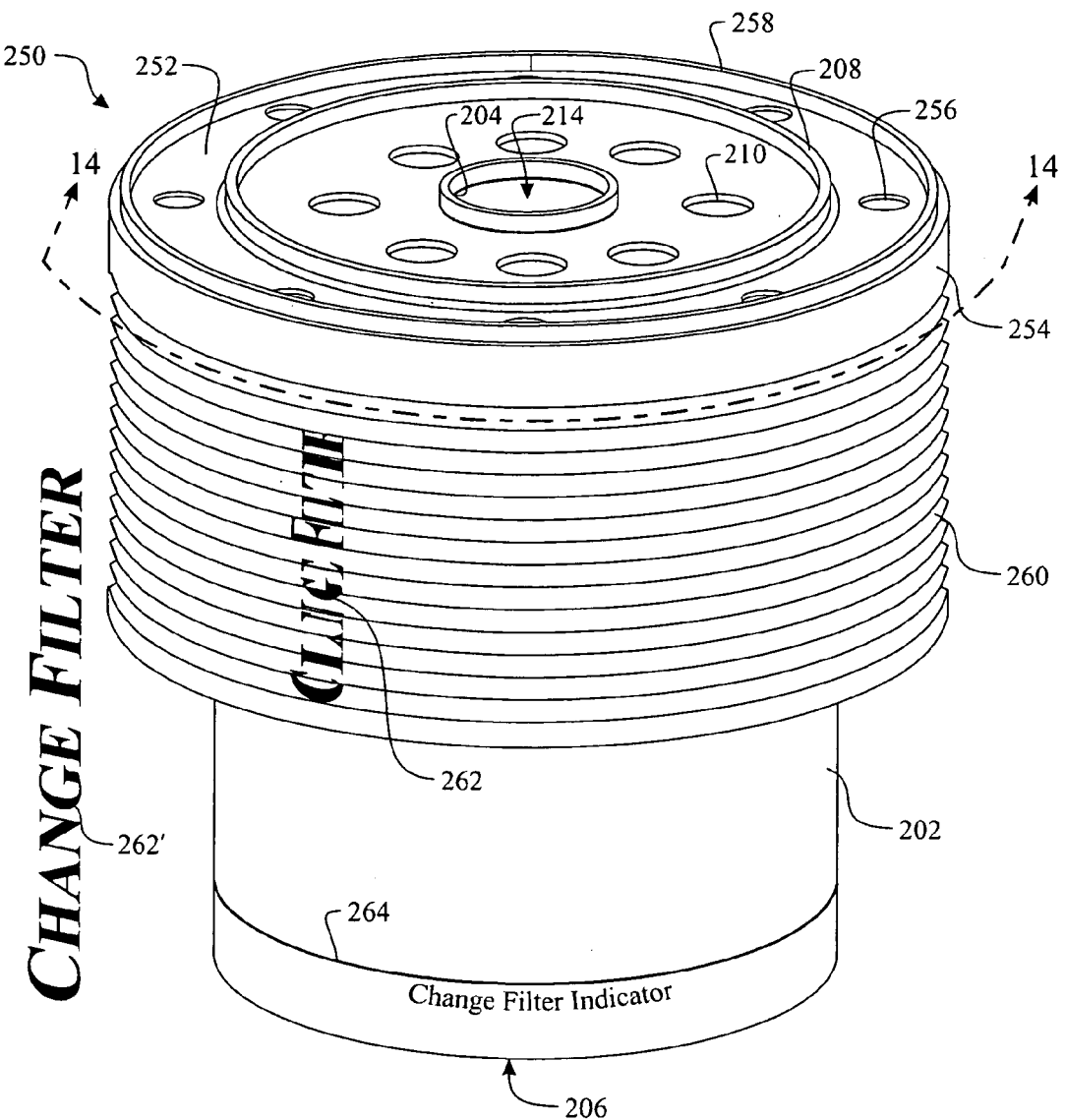
FIG. 13 presents an isometric view of a third lubricating filter embodiment, incorporating an external expanding moisture extraction arrangement.
Figure 14:
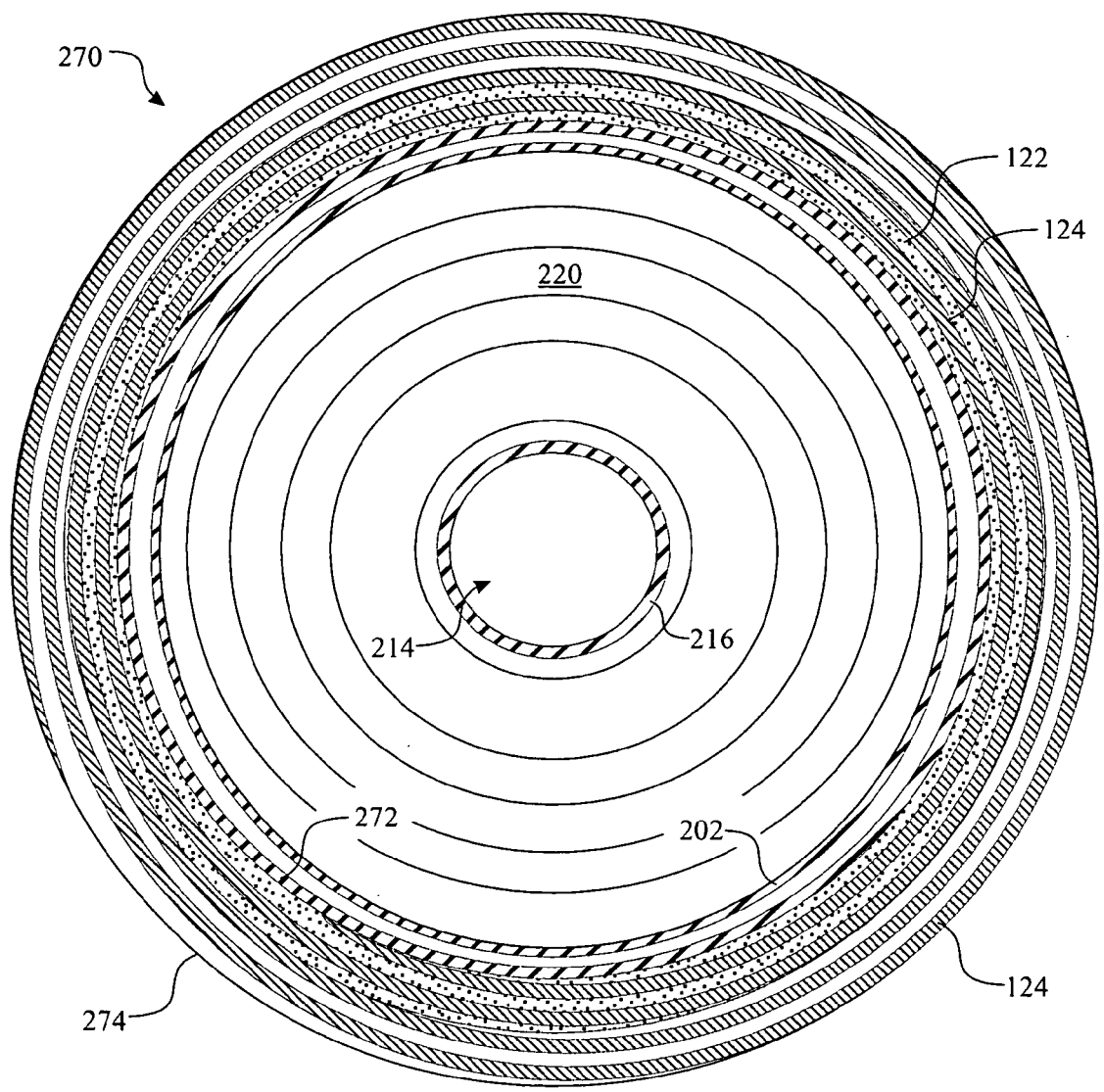
FIG. 14 presents a planar, sectioned view of the lubricating filter embodiment taken along section 14-14 of FIG. 13.

An alternate configuration is illustrated in FIG. 13 and referred to as a dual reclamation processing apparatus 250, with a cross sectional view detailing the moisture absorption process in FIG. 14. The dual reclamation processing apparatus 250 provides two independent reclamation sections. The dual reclamation processing apparatus 250 comprises a common filtration section having the common filtration components previously described herein and a separate moisture absorption section having its own separate flow path. The exemplary moisture absorption section is provided being external to the filter canister 202 of the filtration section. The moisture absorption section is defined via a moisture absorption sidewall 254 having a plurality of fluid ports 256 disposed through a moisture absorption upper seal 252 and a moisture removal section interface seal 258 formed about a perimeter of the moisture absorption sidewall 254 providing a fluid containment seal between the fluid sources and the chamber. An expansion sidewall section 260 is formed along at least a portion of a sidewall of the moisture absorption sidewall 254. The expansion sidewall section 260 allows the sidewall to expand longitudinally as the volume of the Superabsorbent Polymer (SAP) 122 increases. The dual reclamation processing apparatus 250 can include any of a variety of indicators noting when the moisture absorption section requires replacement. One such indicator is a printed indicator 262, which is illegible when the expansion sidewall section 260 is collapsed and legible (printed replacement indicator 262') when expanded. A second such indicator is applied to a respective location on the filter canister 202, whereby the expansion sidewall section 260 expands eventually aligning the bottom of the moisture absorption sidewall 254 to the filter replacement indicator line 264. A spiraling roll of polyester mesh 124 is formed about a container interior 272, containing deposits of Superabsorbant Polymer (SAP) 122 between the initial rolled layers of the polyester mesh 124. The Superabsorbant Polymer (SAP) 122 can be rolled within the internal layers, allowing for expansion outward along the spiraling layers. The roll of layers can be contained within a container exterior body 274. The container exterior body 274 can be pleated allowing for radial expansion. A polypropylene sorbant 126 can be grafted to the last wrap or several wrapped layers of the polyester mesh 124, as previously described.

Figure 15:
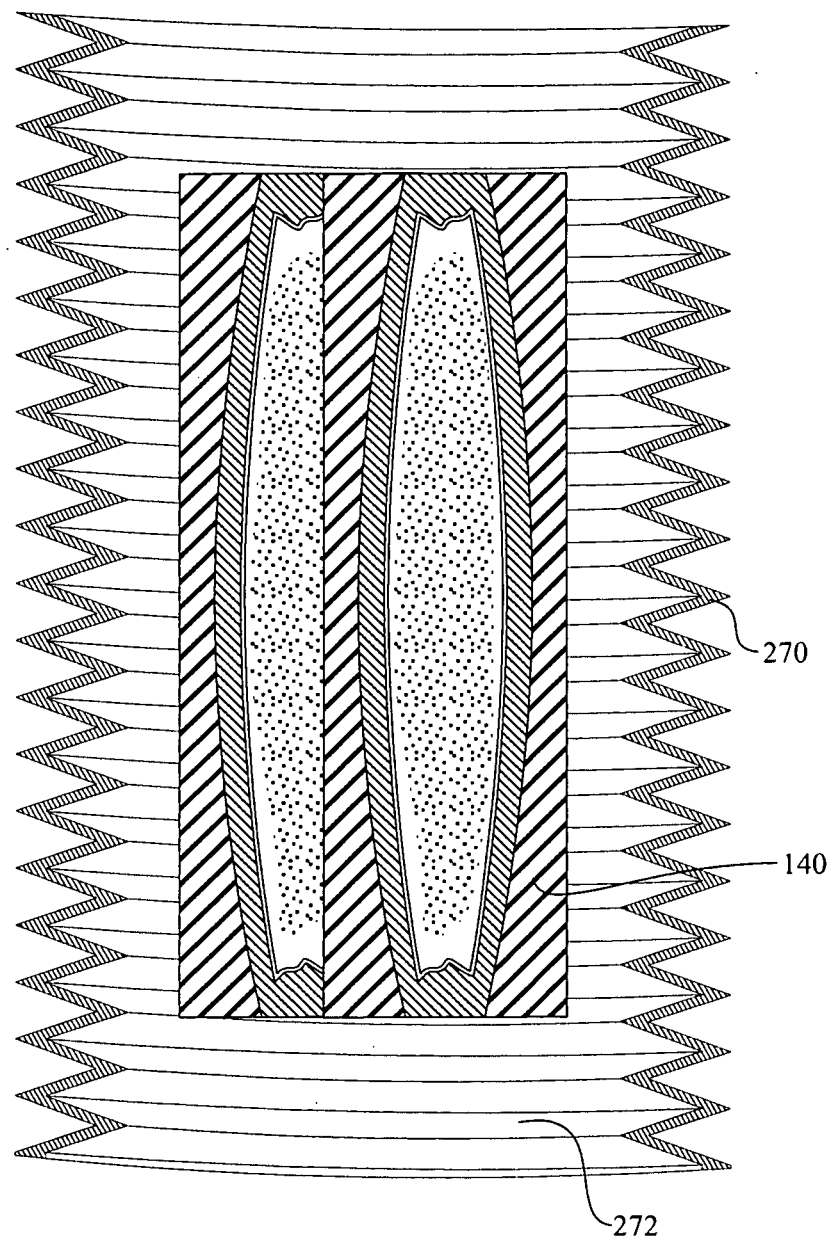
FIG. 15 is a sectioned elevation view of an expanding casing enclosing a plurality of reclamation cartridges.

The moisture absorption can be confined within any expansion enclosure. The expansion can be longitudinally as illustrated in the exemplary embodiment presented in FIG. 15, circumferentially, radially, or any combination therein. The expansion can be accomplished by any known expanding surface 270 such as a pleated surface, a stretchable surface, and the like. The exemplary embodiment presents a longitudinally expanding surface via a pleating. A plurality of moisture absorbent cartridges 140 can be disposed within a container interior 272 of the expanding surface 270. The expanding surface 270 can provide a fluid entrapping enclosure with an inlet and an outlet (not shown, but well understood). Alternately, the expanding surface 270 can be of a sealed, porous material allowing the contaminated fluid to flow through the containing material.

Figure 16:
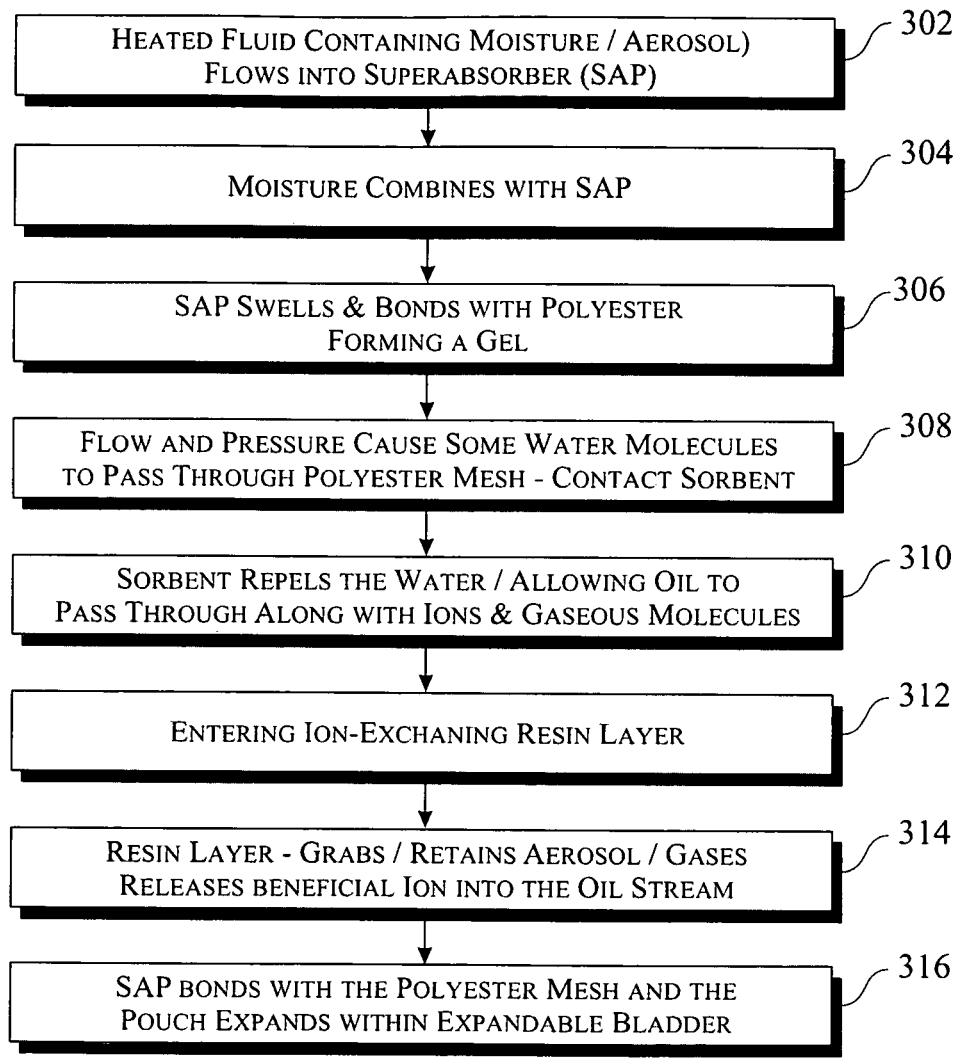
FIG. 16 is an exemplary flow diagram presenting a moisture removal method.

The present invention is provided via a uniquely defined series of processing steps, the steps presented in a reclamation flow diagram 300 of FIG. 16. The process initiates flowing heated fluid (such as oil or other lubricants) that is contaminated with moisture and/or aerosol into a moisture extracting apparatus comprising a superabsorbent polymer 122, in accordance with an expose fluid to the superabsorbent polymer step 302. Entrapped moisture is extracted and absorbs with the superabsorbent polymer 122, in accordance with a moisture absorption step 304. As the SAP absorbs the moisture, the SAP swells. The SAP and combined moisture molecules then bond with the polyester mesh forming a gel. This is referenced as a SAP swelling and bonding step 306. During instances where any moisture fails to be absorbed by the SAP, the moisture contacts a polypropylene sorbant layer 126 in accordance with a moisture flow through control step 308. The polypropylene sorbant layer 126 repels the moisture allowing the SAP additional opportunity to absorb the previously missed moisture. The lubricant continues to flow through the polypropylene sorbant layer 126 into a resin bed, as referred to in a sorbant layer-repelling step 310. The subject lubricant continues, entering an ion-exchanging resin layer 130, in accordance with an exposure to a resin layer step 312. The resin layer 130 extracts, contains and retains aerosols or gases that were previously entrapped within the lubricant. Additionally, the resin layer 130 introduces beneficial ions into the lubricant. These actions are referred to as a resin bed activation step 314. In parallel with the reclamation processes described herein, the SAP is encased within a polyester mesh 124 formed into a bladder. As the moisture continues to be absorbed by the SAP, the SAP expands upward to 500 times the original volume. The SAP bonds with the polyester mesh 124 forming a gel. The bladder expands in conjunction with the increase in volume of the SAP. This is referred to as a SAP pouch absorption and containment via bonding and expansion step 316.

It is understood that the method described herein can be accomplished passing the lubricant through the steps prior to a filtration process, following a filtration step, or a partial amount of the lubricant passing through the moisture removal process in parallel to a filtration process. The process can be used for fluids such as gas, lubricants (such as oil, power steering fluid, transmission fluid, and the like), among others. The use of the resin layer 130 is optional.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

I claim:

1. A moisture separation apparatus for removing moisture from a fluid flowing within a flow path of a second apparatus, the moisture separation apparatus comprising:
    a tubular shaped housing having closed ends and defining an interior volume, a first of the closed ends further defining an entrance port and a discharge port, the entrance port and the discharge port being concentric one with the other wherein the housing further defines a fluid flow path between the entrance port and the discharge port and having first and second flow path portions;
    a single attachment for affixing the moisture separation apparatus to an external structure wherein the single attachment defines one of the discharge port and entrance port;
    a porous and pliant material spanning across and expandable along the first flow path portion, wherein the porous and pliant material is a material that allows for passage of fluid therethrough, the porous and pliant material having embedded therein a water absorption insert, the water absorption insert comprising a Superabsorbant Polymer contained within a boundary at least partially comprising a polyester mesh and expandable within the porous and pliant material as water is absorbed thereby; and
    a filtration chamber defining the second flow path portion and including filter membranes for separating and collecting solids from the fluid passing therethrough.

2. A moisture separation apparatus as recited in claim 1, the water absorption insert further comprising a polypropylene sorbant disposed at least partially about an exterior of the polyester mesh.

3. A moisture separation apparatus as recited in claim 2, wherein the water absorption insert is expandable.

4. A moisture separation apparatus as recited in claim 3, wherein the expansion of the water absorption insert is provided in at least one of:
    a) longitudinally,
    b) circumferentially, and
    c) radially.

5. A moisture separation apparatus as recited in claim 1, the apparatus further comprising a resin layer placed within the flow path between an exterior of the water absorption insert and the at least one fluid discharge port.

6. A moisture separation apparatus as recited in claim 1, wherein the resin layer includes at least one of:
    a) Zeolite,
    b) Expanded perlite,
    c) Calcium Sodium Potassium Aluminum Silicate,
    d) Sodium Potassium Aluminum Silicate,
    e) Hydrated Calcium Aluminum Silicate,
    f) Hydrated Sodium Aluminum Silicate,
    g) Hydrated Calcium Sodium Aluminum Silicate,
    h) Hydrated Sodium Potassium Calcium Aluminum Silicate, and
    i) Hydrated Sodium Calcium Magnesium Aluminum Silicate.

7. A moisture separation apparatus as recited in claim 1, the moisture separation apparatus housing comprising a housing sidewall further comprising at least one expansion feature.

8. A moisture separation apparatus as recited in claim 1, wherein the water absorption insert is in at least one of the following form factors:
    a) rolled,
    b) a folded and bonded cartridge similar to a burrito,
    c) a rolled cartridge forming a spiraled core,
    a) a circular shaped pouch;
    b) a star shaped pouch;
    c) a cylindrically shaped pouch, and
    d) a rectangular shaped pouch.

9. A moisture separation apparatus as recited in claim 1, the apparatus further comprising an expanding absorbent container comprising an expansion feature extending parallel to and a length of the porous and pliant material thickness.

10. A moisture separation apparatus as recited in claim 9, wherein one of the first end wall and second end wall is contiguous with an expanding end of the expansion feature, whereby when the expansion feature expands, the respective contiguous end wall is reconfigured into an extended configuration.

11. A moisture separation apparatus for removing moisture from a fluid flowing within a flow path of a second apparatus, the moisture separation apparatus comprising:
    a tubular shaped housing having closed ends and defining an interior volume, a first of the closed ends further defining an entrance port and a discharge port, the entrance port and the discharge port being concentric one with the other wherein the housing further defines a fluid flow path between the entrance port and the discharge port and having first and second flow path portions;

a single attachment for affixing the moisture separation apparatus to an external structure wherein the single attachment defines one of the discharge port and entrance port;

a porous and pliant material spanning across and expandable along the first flow path portion, wherein the porous and pliant material is a material that allows for passage of fluid therethrough, the porous and pliant material having embedded therein a water absorption insert, the water absorption insert comprising a Superabsorbant Polymer contained within a boundary at least partially comprising a polyester mesh and expandable within the porous and pliant material as water is absorbed thereby; and a filtration chamber comprising a fixed canister interior to and coaxial with the tubular housing and defining the second flow path portion, one end of the fixed canister defining the discharge port, the canister further including filter membranes for separating and collecting solids from the fluid passing therethrough.

12. A moisture separation apparatus as recited in claim 11, the water absorption insert further comprising a polypropylene sorbant disposed at least partially about an exterior of the polyester mesh.

13. A moisture separation apparatus as recited in claim 12, wherein the water absorption insert is expandable.

14. A moisture separation apparatus as recited in claim 13, wherein the expansion is provided in at least one of:
   a) longitudinally,
   b) circumferentially, and
   c) radially.

15. A moisture separation apparatus as recited in claim 11, the apparatus further comprising a resin layer placed within the flow path between an exterior of the water absorption insert and the at least one fluid discharge port.

16. A moisture separation apparatus as recited in claim 11, the moisture separation apparatus housing comprising a housing sidewall further comprising at least one expansion feature.

17. A moisture separation apparatus as recited in claim 11, wherein the water absorption insert is in at least one of the following form factors:
   a) rolled,
   b) a folded and bonded cartridge similar to a burrito,
   c) a rolled cartridge forming a spiraled core,
   d) a circular shaped pouch;
   e) a star shaped pouch;
   f) a cylindrically shaped pouch, and
   g) a rectangular shaped pouch.

18. A moisture separation apparatus as recited in claim 11, the apparatus further comprising an expanding absorbent container comprising an expansion feature extending parallel to and a length of the porous and pliant material thickness.

19. A moisture separation apparatus as recited in claim 18, wherein one of the first end wall and second end wall is contiguous with an expanding end of the expansion feature, whereby when the expansion feature expands, the respective contiguous end wall is reconfigured into an extended configuration.

* * * * *